United States Patent
Goda (10) Patent No.: US 9,378,441 B2
(45) Date of Patent: Jun. 28, 2016

(54) INFORMATION PROCESSING APPARATUS, METHOD FOR CONTROLLING THE SAME, AND PROGRAM

(71) Applicant: CANON KABUSHIKI KAISHA, Tokyo (JP)

(72) Inventor: Keigo Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/339,318

(22) Filed: Jul. 23, 2014

(65) Prior Publication Data

US 2015/0029537 A1    Jan. 29, 2015

(30) Foreign Application Priority Data

Jul. 26, 2013   (JP) ................... 2013-155310

(51) Int. Cl.
  *G06K 15/00* (2006.01)
(52) U.S. Cl.
  CPC .................. *G06K 15/4055* (2013.01)
(58) Field of Classification Search
  CPC ..... G06K 15/4055; G06F 3/1221; G06F 1/32; G06F 1/3284; G06F 1/329; H04N 1/00891; H04N 1/00885; H04N 1/00888
  USPC .................................... 358/1.14, 1.1
  See application file for complete search history.

(56) References Cited

U.S. PATENT DOCUMENTS

2002/0178389 A1*  11/2002  Satoh ........................ 713/310
2006/0279766 A1*  12/2006  Kobayashi ................. 358/1.14

FOREIGN PATENT DOCUMENTS

JP        8-183228 A     7/1996

OTHER PUBLICATIONS

Kataoka et al., Electronic Equipment, Mar. 26, 2009, JP 2009064206 A.*

* cited by examiner

*Primary Examiner* — Martin Mushambo
(74) *Attorney, Agent, or Firm* — Canon U.S.A., Inc., IP Division (57) ABSTRACT

If an event that requires reboot of an image forming apparatus has occurred, a time remaining until a shutdown time set for an automatic shutdown function is compared against a threshold value, and if the time remaining is shorter than the threshold value, the image forming apparatus shuts down without rebooting.

8 Claims, 7 Drawing Sheets

| ERROR CODE | ABNORMALITY | REMOVAL THROUGH REBOOT |
|---|---|---|
| E-001 | FIXING UNIT FAILURE | IMPOSSIBLE |
| E-002 | HARD DISK FAILURE | IMPOSSIBLE |
| E-003 | SUB-CPU HANG-UP | POSSIBLE |
| ⋮ | ⋮ | ⋮ |

FIG. 7

INFORMATION PROCESSING APPARATUS, METHOD FOR CONTROLLING THE SAME, AND PROGRAM

BACKGROUND

1. Field

Aspects of the present invention generally relate to control of an information processing apparatus, such as an image forming apparatus, having a function of automatically shutting down if a certain condition is satisfied.

2. Description of the Related Art

In general, when an operation for forming an image cannot be executed due to occurrence of an abnormality, a user of an existing image forming apparatus is informed of the abnormality through an error code or the like displayed on an operation unit. When the error code has been displayed on the operation unit, usually a service person is called to take necessary measures such as repairs to the image forming apparatus.

However, a service person need not necessarily be called even if an abnormality has occurred in the image forming apparatus and an error code has been displayed. For example, this holds when one of a plurality of central processing units (CPUs), which are usually included in the image forming apparatus to control components, has unexpectedly hung up. In this case, the hang-up is removed by rebooting the image forming apparatus, and the operation for forming an image can be performed again. When reboot of the image forming apparatus is only rebooted, a service person need not necessarily be called.

Therefore, when a particular type of abnormality that can be removed by rebooting the image forming apparatus has been detected, the image forming apparatus is automatically rebooted to remove the abnormality. For example, in Japanese Patent Laid-Open No. 8-183228, an image forming apparatus that is automatically rebooted when a certain period of time has elapsed since occurrence of an abnormality is proposed.

In recent years, image forming apparatuses having an automatic shutdown function have been developed. The automatic shutdown function is a function of automatically turning off an image forming apparatus to save power when, for example, a user has not used the image forming apparatus for a certain period of time. If the above-described operation for automatically rebooting an image forming apparatus is performed when an abnormality has occurred in such an image forming apparatus having the automatic shutdown function, the following problem arises.

Here, assume a case in which an abnormality occurs in an image forming apparatus when the image forming apparatus will soon be shut down by the automatic shutdown function, and the image forming apparatus is automatically rebooted. That is, assume a case in which the operation for automatically rebooting the image forming apparatus is performed immediately before the automatic shutdown function operates.

In this case, for example, immediately after the image forming apparatus is automatically rebooted, the automatic shutdown function operates to turn off the image forming apparatus. That is, even when, as a result of the reboot, the image forming apparatus has recovered to a state in which the operation for forming an image can again be performed, the image forming apparatus is immediately turned off by the automatic shutdown function, thereby preventing the image forming apparatus from performing the operation for forming an image or the like.

In addition, if the image forming apparatus is shut down by the automatic shutdown function, the same result as when the image forming apparatus has been rebooted is obtained when the user later turns on the image forming apparatus again. That is, the same result as that obtained by reboot is obtained if the automatic shutdown function operates. In this case, the above-described automatic reboot need not necessarily be performed even if an error has occurred. In addition, it is not desirable in terms of power consumption and noise to reboot the image forming apparatus more often than necessary.

In addition, the same situation as that posed when the image forming apparatus is rebooted upon occurrence of an error arises when, for example, the image forming apparatus is automatically rebooted after a program is automatically updated or when the image forming apparatus needs to be rebooted in order to apply a change made to a setting (for example, when an Internet Protocol (IP) address has been changed).

SUMMARY

Aspects of the present invention generally provide a mechanism for suppressing execution of unnecessary reboot, thereby suppressing wasteful consumption of power and generation of unnecessary noise.

According to an aspect of the present invention, an information processing apparatus that has a shutdown function by which the information processing apparatus automatically shuts down if a certain condition is satisfied includes at least a first control unit configured to, if an event requiring restart of the information processing apparatus has occurred and if a time remaining until a shutdown time, at which shutdown is performed by the shutdown function, is shorter than a threshold, restrict restarting the information processing apparatus.

Further features of the present disclosure will become apparent from the following description of exemplary embodiments with reference to the attached drawings.

DESCRIPTION OF THE EMBODIMENTS

Exemplary embodiments will be described hereinafter with reference to the drawings.

First Embodiment

Figure 1:
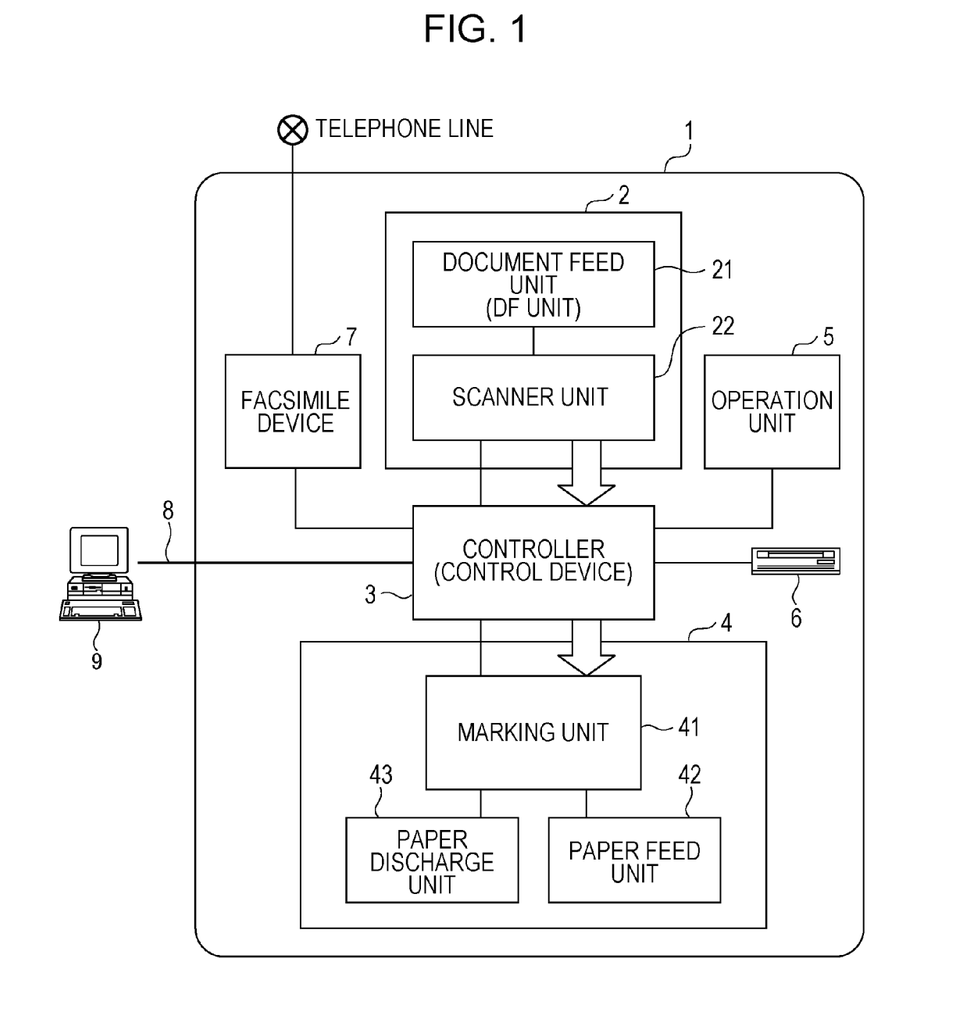
FIG. 1 is a diagram illustrating an example of an image forming system to which an image forming apparatus according to an exemplary embodiment can be applied.

FIG. 1 is a block diagram illustrating an example of an image forming system to which an information processing apparatus according to an exemplary embodiment can be applied.

In FIG. 1, an image forming apparatus 1 as the information processing apparatus is illustrated. The image forming apparatus 1 includes a scanner device 2, a controller 3, a printer device 4, an operation unit 5, a hard disk device 6, and a facsimile device 7.

The scanner device 2 optically reads an image from a document and converts the read image into a digital image. The scanner device 2 includes a document feed unit 21 capable of automatically setting a set of documents as necessary and a scanner unit 22 capable of optically scanning a document and converting the document into a digital image and transmits image data obtained as a result of the conversion to the controller 3.

The printer device 4 outputs a digital image to a paper device. The operation unit 5 is used for operating the image forming apparatus 1. The printer device 4 includes a paper feed unit 42 capable of feeding sheets of paper one by one, a marking unit 41 for printing image data on the fed pieces of paper, and a paper discharge unit 43 for discharging the pieces of paper after the printing.

The operation unit 5 includes operation buttons and a display panel such as a liquid crystal screen, which are not illustrated, for enabling a user to instruct the image forming apparatus 1 to perform operations such as image copying and suggesting various pieces of information regarding the image forming apparatus 1 to the user. The hard disk device 6 stores digital images, control programs, and the like. It is to be noted that a solid-state drive (SSD) or another storage device may be included instead of the hard disk device 6. The facsimile device 7 transmits digital images to a telephone line or the like.

The controller 3 is connected to the modules such as the scanner device 2, the printer device 4, the operation unit 5, the hard disk device 6, and the facsimile device 7 and issues instructions to these modules to control the entirety of the image forming apparatus 1 and execute jobs on the image forming apparatus 1. A computer 9 is capable of outputting and receiving digital images to and from the image forming apparatus 1 through a network (local area network (LAN)) 8 and issuing jobs and instructions to the devices.

The image forming apparatus 1 has various functions and is capable of executing various jobs. Examples will be described hereinafter.

Copying Function

An image read by the scanner device 2 is recorded in the hard disk device 6. At the same time, the printer device 4 performs printing.

Image Transmission Function

An image read by the scanner device 2 is transmitted to the computer 9 through the LAN 8.

Image Saving Function

An image read by the scanner device 2 is recorded in the hard disk device 6. The image is transmitted or printed as necessary.

Image Printing Function

For example, a page description language transmitted from the computer 9 is analyzed, and the printer device 4 performs printing.

In addition, the image forming apparatus 1 according to this embodiment has the following additional function.

Automatic Shutdown Function

This is a function of automatically shutting down and turning off the image forming apparatus 1 when the image forming apparatus 1 has not been used for a certain period of time, that is, for example, when the user has not operated the image forming apparatus 1 for a certain period of time or when the image forming apparatus 1 has not received a job for a certain period of time. The certain period of time, that is, a waiting time until the shutdown, may be set by the user to the image forming apparatus 1 through the operation unit 5.

The controller 3 will be described hereinafter with reference to FIG. 2.

Figure 2:
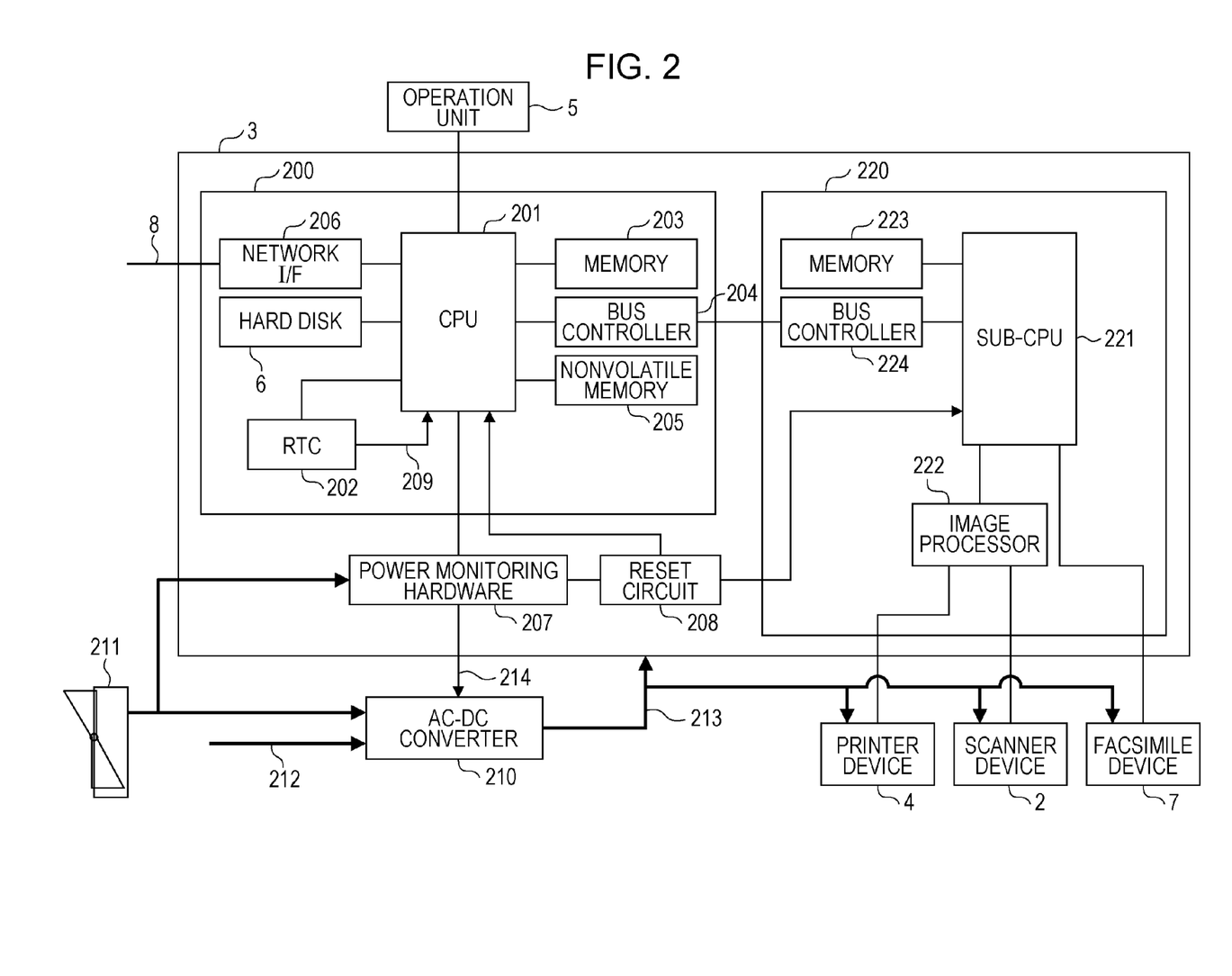
FIG. 2 is a diagram illustrating an example of the configuration of a controller.

FIG. 2 is a block diagram illustrating an example of the configuration of the controller 3.

As illustrated in FIG. 2, the controller 3 includes a main board 200 and a sub-board 220.

The main board 200 is a so-called general-purpose central processing unit (CPU) system. The main board 200 includes a CPU 201, a memory 203, a bus controller 204, a nonvolatile memory 205, a real-time clock (RTC) 202, and a network interface (I/F) 206.

The CPU 201 controls the entirety of the main board 200 by, for example, executing a program loaded from the nonvolatile memory 205 into the memory 203. The nonvolatile memory 205 stores firmware for controlling the image forming apparatus 1, various setting values, and the like. The above-mentioned waiting time until the shutdown of the image forming apparatus 1 set for the automatic shutdown function may be stored in the nonvolatile memory 205. The memory 203 is used as a main storage memory of the CPU 201. The bus controller 204 is used for connecting the main board 200 to the sub-board 220.

The CPU 201 can read the current time from the RTC 202. A battery, which is not illustrated, supplies power to the RTC 202, and the RTC 202 is configured to always keep operating regardless of the on/off state of the image forming apparatus 1. In addition, the RTC 202 has an alarm function for notifying the CPU 201 that a specified time has come by inputting an interrupt signal 209 to the CPU 201 at a preset time.

The network I/F 206 is a network interface that controls a connection to the LAN 8. It is to be noted that the operation unit 5, the hard disk device 6, and the like are connected to the main board 200 from the outside.

The sub-board 220 includes a relatively small general-purpose CPU system and image processing hardware and performs image processing when the copying function or the image printing function is executed. The sub-board 220 includes a sub-CPU 221, a memory 223, an image processor 222, and a bus controller 224.

The sub-CPU 221 controls the entirety of the sub-board 220 by, for example, executing programs loaded from the nonvolatile memory 205 into the memory 223. The memory 223 is used as a main storage memory of the sub-CPU 221. The image processor 222 performs digital image processing.

The bus controller 224 is used for connecting the sub-board 220 to the main board 200. The sub-board 220 is connected to the main board 200 through the bus controller 224. The bus controller 204 and the bus controller 224 have functions of performing message communication between the CPU 201 and the sub-CPU 221. In addition, the printer device 4, the scanner device 2, the facsimile device 7, and the like are connected to the sub-board 220 from the outside.

An alternating current-to-direct current (AC-DC) converter 210 is a device that supplies power in the image forming apparatus 1. The AC-DC converter 210 generates DC power 213 from AC power 212 and supplies the DC power 213 to the controller 3, the scanner device 2, the printer device 4, and the facsimile device 7. A switch 211 is a toggle switch for enabling the user to turn on or off the image forming apparatus 1. The state of the switch 211 is transmitted to the AC-DC converter 210 and power monitoring hardware 207.

The power monitoring hardware 207 is dedicated hardware logic that monitors power control of the image forming apparatus 1. The power monitoring hardware 207 has a function of transmitting the state of the switch 211 to the CPU 201. Furthermore, the power monitoring hardware 207 has a function of controlling a reset circuit 208 and a function of controlling a power remote signal 215 to be output. The power remote signal 214 is a signal for controlling an output of the AC-DC converter 210.

The reset circuit 208 is hardware logic capable of resetting the CPU 201 and the sub-CPU 221. The reset circuit 208 is used for resetting the controller 3 when the image forming apparatus 1 is rebooted (restarted). When the CPU 201 can operate normally, the power monitoring hardware 207 is capable of controlling the reset circuit 208 in accordance with an instruction from the CPU 201 and resetting the system.

The user can turn on or off the image forming apparatus 1 by operating the switch 211. By turning on the switch 211, the AC power 212 is supplied to the AC-DC converter 210, which in turn generates the DC power 213.

On the other hand, when the switch 211 has been turned off, the supply of power is to be continued until the controller 3 completes shutdown of the system. In this case, the power monitoring hardware 207 notifies the CPU 201 that the switch 211 has been turned off, and operates in such a way as to stop the supply of all power (DC power 213) using the power remote signal 214.

It is to be noted that FIG. 2 is a simplified diagram. For example, the CPU 201, the sub-CPU 221, and the like include a large number of pieces of CPU peripheral hardware such as chip sets, bus bridges, and clock generators, but these components are omitted in this description because the granularity of the description does not necessitate description of such components. The illustrated block configuration is not seen to be limiting.

Next, an operation performed for the automatic shutdown function of the image forming apparatus 1 will be described with reference to FIG. 3.

Figure 3:
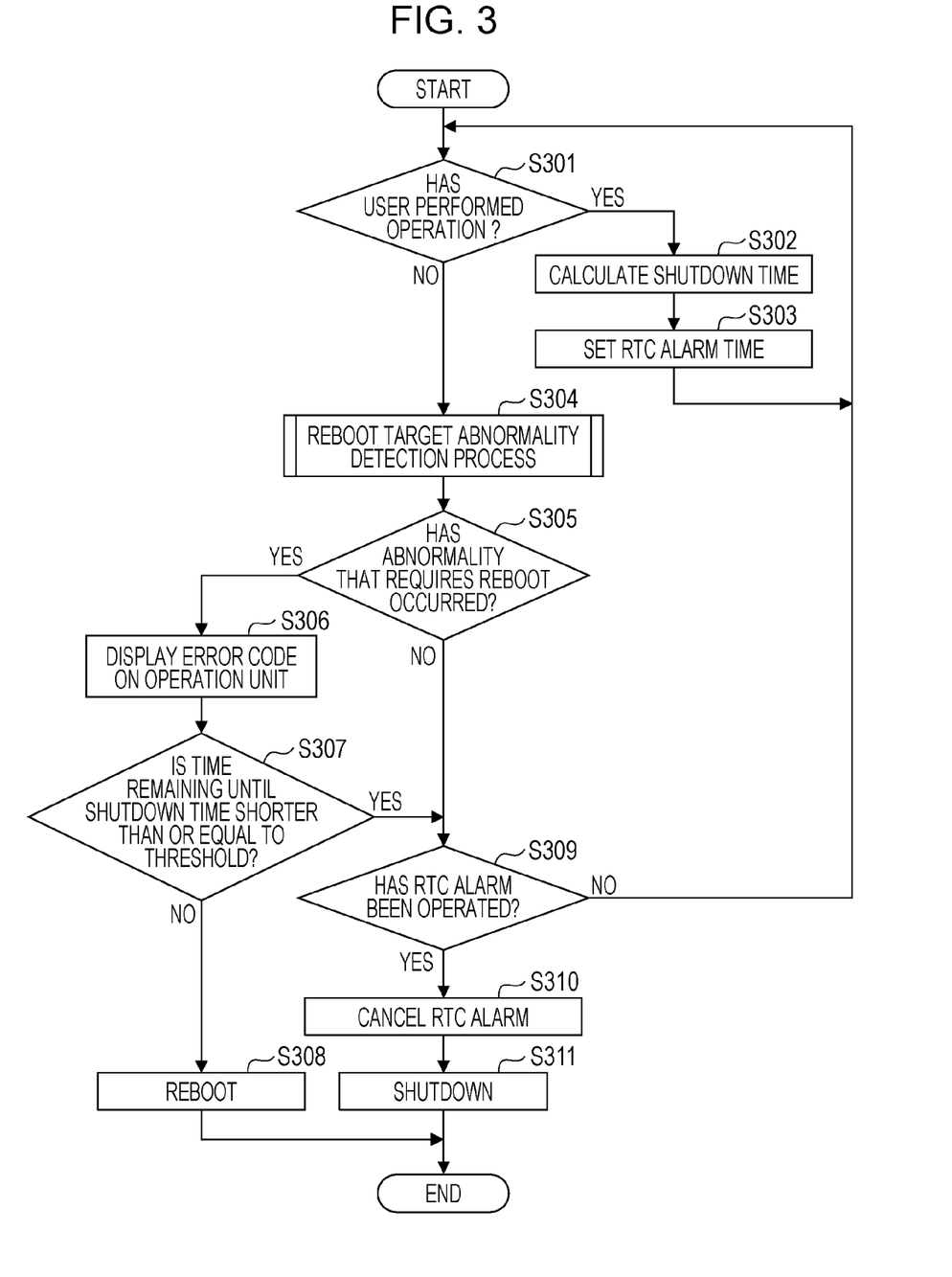
FIG. 3 is a flowchart illustrating an example of an operation performed by the image forming apparatus according to a first embodiment.

FIG. 3 is a flowchart illustrating an example of the operation realized by the automatic shutdown function of the image forming apparatus 1 according to the first embodiment. A process described in the flowchart is realized by the CPU 201 by executing a program loaded from the nonvolatile memory 205 into the memory 203. It is to be noted that the CPU 201 always keeps performing the process described in the flowchart when the image forming apparatus 1 is turned on.

In S301, the CPU 201 determines whether or not the CPU 201 has received an operation performed by the user on the image forming apparatus 1 through the operation unit 5 or a job from the computer 9. If the CPU 201 determines that the CPU 201 has received an operation performed by the user on the image forming apparatus 1 or a job from the computer 9 (YES in S301), the CPU 201 causes the process to proceed to S302.

In S302, the CPU 201 calculates a time at which the image forming apparatus 1 is shut down the automatic shutdown function. The time is later than the current time by a certain period of elapsed time. The certain period is preset by the user and stored in the nonvolatile memory 205 or the like. In addition, the current time can be read from the RTC 202.

Next, in S303, the CPU 201 activates the alarm function of the RTC 202. The CPU 201 sets, for the RTC 202, the time at which the image forming apparatus 1 is shut down calculated in S302 in order to make it possible to receive a notification from the RTC 202 at the time using the interrupt signal 209. It is to be noted that when the processing in S303 has been completed, the CPU 201 causes the process to proceed to S301.

On the other hand, if the CPU 201 determines in S301 that the CPU 201 has not received an operation performed by the user on the image forming apparatus 1 or a job from the computer 9 (NO in S301), the CPU 201 causes the process to proceed to S304. In S304, the CPU 201 performs a process (reboot target abnormality detection process) for detecting whether or not a particular abnormality that requires reboot of the image forming apparatus 1 has occurred. Here, the reboot target abnormality detection process in S304 will be described with reference to FIG. 4.

Figure 4:
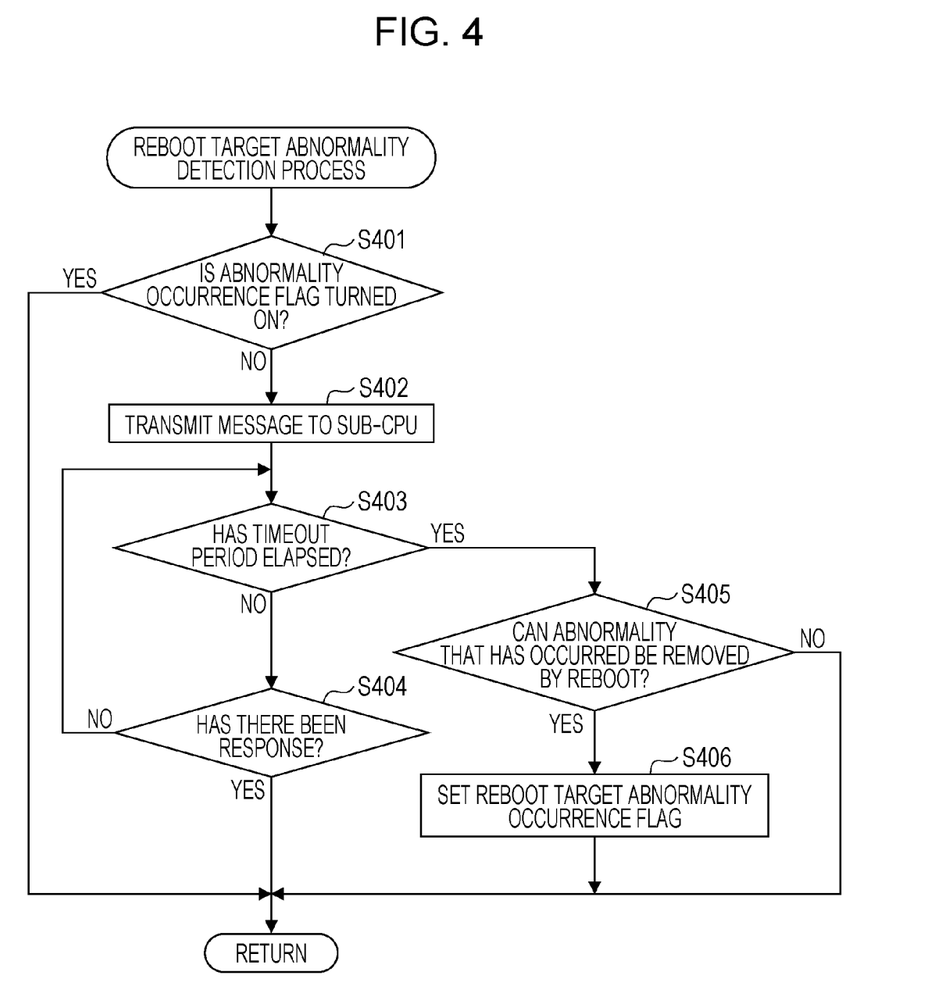
FIG. 4 is a flowchart illustrating an example of a process for detecting occurrence of an abnormality that requires reboot.

FIG. 4 is a flowchart illustrating an example of the process for detecting whether or not an abnormality that requires reboot has occurred. In the image forming apparatus 1 according to this embodiment, reboot is required when a hang-up of the sub-CPU 221 has been detected. This configuration is just an example, and is not seen to be limiting. It is to be noted that the process described in the flowchart is realized by the CPU 201 by executing a program loaded from the nonvolatile memory 205 into the memory 203.

In S401, the CPU 201 determines on the basis of an abnormality occurrence flag whether or not an abnormality that requires reboot has already been detected. If an abnormality that requires reboot has already been detected, the abnormality detection process need not be performed again. Therefore, the CPU 201 provides the memory 203 with a flag (abnormality occurrence flag) indicating that an abnormality has been detected and uses the flag in the determination.

If the CPU 201 determines that an abnormality that requires reboot has already been detected (the abnormality occurrence flag is on) (YES in S401), the CPU 201 ends the process described in the flowchart.

On the other hand, if the CPU 201 determines that an abnormality that requires reboot has not been detected (the abnormality occurrence flag is off) (NO in S401), the CPU 201 causes the process to proceed to S402.

In S402, the CPU 201 transmits a response request message to the sub-CPU 221 through the bus controller 204. The sub-CPU 221 is configured to return a response message to the CPU 201 after receiving the response request message from the CPU 201, unless there is a problem such as a hang-up.

Next, in S403, the CPU 201 determines whether or not a certain timeout period has elapsed since the transmission of the message in S402. The timeout period can be set as a period long enough for the CPU 201 to receive a response message from the sub-CPU 221 in consideration of the performance of the sub-CPU 221. In this embodiment, for example, the timeout period is set to about 10 seconds. However, any timeout period that would enable practice of the present exemplary embodiment is applicable.

If the CPU 201 determines in S403 that the timeout period has not elapsed yet (NO in S403), the CPU 201 causes the process to proceed to S404. In S404, the CPU 201 determines whether or not the CPU 201 has received a response message from the sub-CPU 221. If the CPU 201 determines that the CPU 201 has received a response message from the sub-CPU 221 (YES in S404), the CPU 201 ends the process described in the flowchart.

On the other hand, if the CPU 201 determines that the CPU 201 has not received a response message from the sub-CPU 221 (NO in S404), the CPU 201 causes the process to proceed to S403 and makes the determination as to the timeout period again.

If the CPU 201 determines in S403 that the timeout period has already elapsed (YES in S403), the CPU 201 causes the process to proceed to S405. This is a case in which the CPU 201 has not received a response message from the sub-CPU 221 before the timeout period elapses. Therefore, the CPU 201 determines that the sub-CPU 221 has hung up (an abnormality of Error Code E-003 has occurred) and causes the process to proceed to S405.

Figure 6:
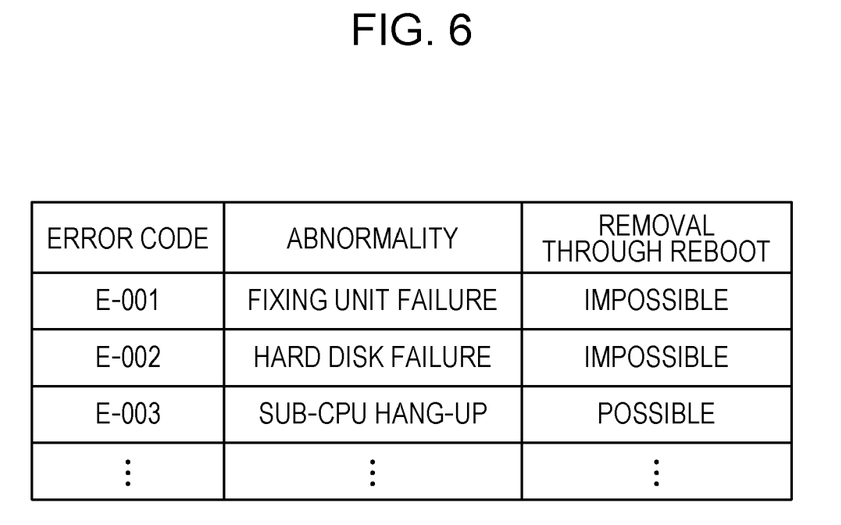
FIG. 6 is a diagram illustrating an example of a list of information indicating whether or not abnormalities that have occurred can be removed by reboot.

In S405, the CPU 201 determines whether or not the abnormality that has occurred (for example, a hung-up of the sub-CPU 221) can be removed by reboot. The firmware executed by the CPU 201 prepares a list of information (stored in the nonvolatile memory 205), which is illustrated in FIG. 6, indicating abnormalities and whether or not the abnormalities can be removed by reboot. The CPU 201 determines on the basis of the list of information whether or not the abnormality that has occurred can be removed by reboot.

FIG. 6 is a diagram illustrating an example of the list of information indicating whether or not abnormalities that have occurred can be removed by reboot.

As illustrated in FIG. 6, the list of information stores abnormalities and information indicating whether or not the abnormalities can be removed by reboot associated with error codes corresponding to the abnormalities. The CPU 201 can determine on the basis of the list of information whether or not an abnormality that has occurred can be removed by reboot by referring to an error code of the abnormality. It is to be noted that the list of information illustrated in FIG. 6 is merely an example, and the list of information is not limited to this. The flowchart of FIG. 4 will be described again hereinafter.

If the CPU 201 determines in S405 that the abnormality that has occurred cannot be removed by reboot (NO in S405), the CPU 201 ends the process described in the flowchart. On the other hand, if the CPU 201 determines in S405 that the abnormality that has occurred can be removed by reboot (YES in S405), the CPU 201 causes the process to proceed to S406. It is to be noted that in the example illustrated in FIG. 4, a hang-up of the sub-CPU 221 is detected as an abnormality on the basis of whether or not there has been a response to the transmission of a message to the sub-CPU 221, and whether or not the abnormality can be removed by reboot is determined in S405. Therefore, in this example, the result of the determination in S405 is invariably YES, and the CPU 201 causes the process to proceed to S406.

In S406, the CPU 201 turns on, in the memory 203, the flag indicating that an abnormality has been detected (turns on the abnormality occurrence flag) and ends the process described in the flowchart.

In the above description, the CPU 201 detects only a hang-up of the sub-CPU 221 that requires reboot. However, this is a simplified description, and obviously the CPU 201 may be configured to monitor a plurality of types of abnormalities including ones that do not require reboot. For example, a failure of a fixing unit of the printer device 4 and a failure of the hard disk device 6 are examples of abnormalities that do not require reboot. When these abnormalities are monitored as well, whether or not an abnormality can be removed by reboot is determined on the basis of the list of information illustrated in FIG. 6 as described with reference to S405 after the abnormality is detected. This configuration will be described in detail in a third embodiment, which will be described later.

The flowchart of FIG. 3 will be described again hereinafter.

When the reboot target abnormality detection process (FIG. 4) in S304 has ended, the CPU 201 causes the process to proceed to S305. In S305, the CPU 201 determines whether or not an abnormality that requires reboot has been detected (the abnormality occurrence flag is on) in the reboot target abnormality detection process in S304.

If the CPU 201 determines that an abnormality that requires reboot has been detected (the abnormality occurrence flag is on) (YES in S305), the CPU 201 causes the process to proceed to S306. On the other hand, if the CPU 201 determines that an abnormality that requires reboot has not been detected (the abnormality occurrence flag is off) (NO in S305), the CPU 201 causes the process to proceed to S309. It is to be noted that because the CPU 201 is configured to be capable of operating independently of the sub-CPU 221, the CPU 201 can continue the operations illustrated in the flowcharts of FIGS. 3 and 4 or the like even if the sub-CPU 221 has hung up.

If an abnormality that requires reboot has been detected, the CPU 201 notifies, in S306, the user of the detected abnormality by displaying an error code corresponding to the abnormality detected in S304 on the display panel of the operation unit 5. As a result, the operation unit 5 keeps displaying the error code until the image forming apparatus 1 is rebooted or shut down, thereby enabling the user to recognize the error that has occurred.

Next, in S307, the CPU 201 determines whether or not time remaining until the shutdown time calculated in S302 is shorter than or equal to a threshold. More specifically, the CPU 201 compares, using the RTC 202, the current time and the time at which the set alarm function operates and determines whether or not time remaining until the time at which the set alarm function operates is shorter than or equal to the threshold. The threshold can be longer than time taken to reboot the image forming apparatus 1 and, for example, is 1 minute in the case of the image forming apparatus 1 according to this embodiment. In addition, it is assumed that the threshold is preset by the user and stored in the nonvolatile memory 205.

If the CPU 201 determines that the time remaining until the shutdown time is not shorter than or equal to the threshold (NO in S307), the CPU 201 determines that the current time is not immediately before the automatic shutdown and reboots the image forming apparatus 1 by executing a reboot process (restart process) (S308). In the reboot process in S308, the CPU 201 executes a firmware ending process, such as a process for saving the settings of the image forming apparatus 1, and then operates the reset circuit 208 through the power monitoring hardware 207 to reset the CPU 201 and the sub-CPU 221. Thus, the image forming apparatus 1 is rebooted.

On the other hand, if the CPU 201 determines in S307 that the time remaining until the shutdown time is shorter than or equal to the threshold (YES in S307), the CPU 201 determines that the current time is immediately before the automatic shutdown and causes the process to proceed to S309.

In S309, the CPU 201 determines whether or not the interrupt signal 209 has been input as a result of the operation of the alarm function of the RTC 202. If the CPU 201 determines that the alarm function of the RTC 202 has not operated yet and the interrupt signal 209 has not been input (NO in S309), the CPU 201 causes the process to proceed to S301.

On the other hand, if the CPU 201 determines that the alarm function of the RTC 202 has operated and the interrupt signal 209 has been input (YES in S309), the CPU 201 causes the process to proceed to S310.

In S310, the CPU 201 cancels the setting of the alarm function of the RTC 202 to invalidate the alarm function of the RTC 202. Furthermore, in S311, the CPU 201 executes a shutdown process. In the shutdown process in S311, the CPU 201 executes the firmware ending process, and then controls the power remote signal 214 through the power monitoring hardware 207 to stop supplying the DC power 213 to the components of the image forming apparatus 1. As a result, the image forming apparatus 1 is turned off.

As described above, according to the first embodiment, unnecessary reboot is not executed even if an abnormality that automatically triggers reboot occurs in a state (immediately before the automatic shutdown) in which the image forming apparatus 1 will soon be shut down by the automatic shutdown function. Therefore, wasteful consumption of power and noise caused by unnecessary reboot can be suppressed.

It is to be noted that although the controller 3 includes one sub-CPU in the configuration of the image forming apparatus 1 according to this embodiment, this is just an example, and the controller 3 may include a plurality of sub-CPUs, instead.

Second Embodiment

In the first embodiment, if an abnormality (an abnormality that can be removed by reboot) that automatically reboots the image forming apparatus 1 occurs immediately before the shutdown caused by the automatic shutdown function, the image forming apparatus 1 waits for the shutdown time and then shuts down. However, this configuration is not seen to be limiting. For example, if an abnormality that automatically reboots the image forming apparatus 1 occurs immediately before the shutdown, the image forming apparatus 1 may be shut down immediately. This embodiment will be described hereinafter.

It is to be noted that the configuration according to the second embodiment is the same as that according to the first embodiment, except for a process executed by the CPU 201 after occurrence of an abnormality is detected. In the following description, only the difference from the first embodiment will be described, and description of the same parts is omitted.

Figure 5:
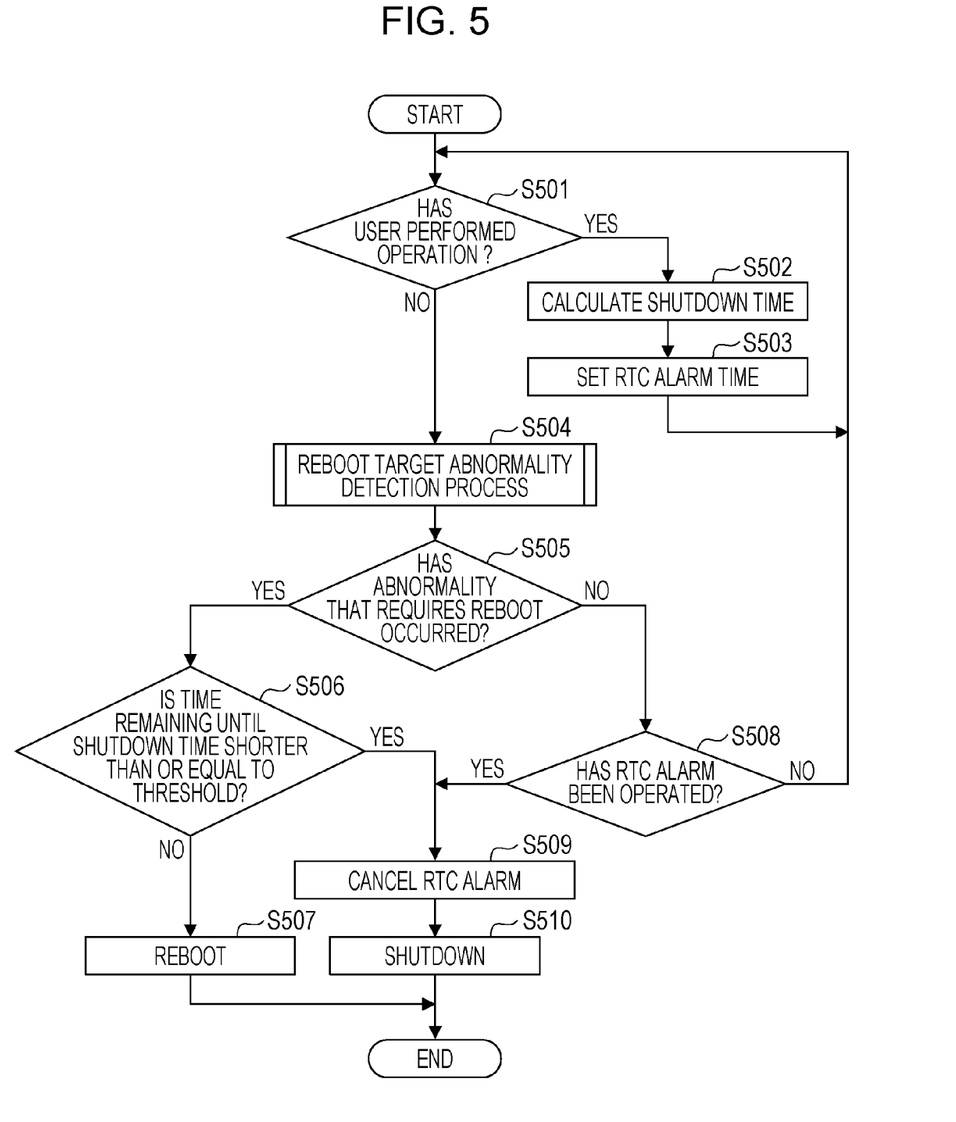
FIG. 5 is a flowchart illustrating an example of an operation performed by an image forming apparatus according to a second embodiment.

FIG. 5 is a flowchart illustrating an example of an operation realized by the automatic shutdown function of the image forming apparatus 1 according to the second embodiment. A process described in this flowchart is realized by the CPU 201 by executing a program loaded from the nonvolatile memory 205 into the memory 203. It is to be noted that the CPU 201 always keeps performing the process described in the flowchart when the image forming apparatus 1 is turned on.

First, processing in S501 to S504 corresponds to the processing in S301 to S304, respectively, illustrated in FIG. 3 described in the first embodiment, and description thereof is omitted since they are the same operation.

If the CPU 201 determines in S505 that an abnormality that requires reboot has been detected (the abnormality occurrence flag is on) (YES in S505), the CPU 201 causes the process to proceed to S506. On the other hand, if the CPU 201 determines that an abnormality that requires reboot has not been detected (the abnormality occurrence flag is off) (NO in S505), the CPU 201 causes the process to proceed to S508.

In S506, the CPU 201 determines whether or not the time remaining until the shutdown time calculated in S502 is shorter than or equal to a threshold. This processing is the same as the processing in S307 illustrated in FIG. 3, and accordingly detailed description thereof is omitted.

If the CPU 201 determines that the time remaining until the shutdown time is not shorter than or equal to the threshold (NO in S506), the CPU 201 determines that the current time is not immediately before the automatic shutdown and reboots the image forming apparatus 1 (S507). This processing is the same as the processing in S308 illustrated in FIG. 3, and detailed description thereof is omitted.

On the other hand, if the CPU 201 determines in S506 that the time remaining until the shutdown time is shorter than or equal to the threshold (YES in S506), the CPU 201 determines that the current time is immediately before the automatic shutdown and causes the process to proceed to S509.

In S509, the CPU 201 immediately cancels the setting of the alarm function of the RTC 202 (S509) and executes the shutdown process (S510). As a result, the image forming apparatus 1 is turned off. It is to be noted that the processing in S509 and 5510 is the same as that in S310 and 5311, respectively, illustrated in FIG. 3, and accordingly description thereof is omitted. In addition, in the second embodiment, if the time remaining until the shutdown time is shorter than or equal to the threshold, the setting of the RTC 202 is canceled (S509) and the image forming apparatus 1 is shutdown (S510) immediately without waiting for the operation of the RTC alarm function. This is the difference from the first embodiment (FIG. 3).

On the other hand, if the CPU 201 determines in S505 that an abnormality that requires reboot has not been detected (NO in S505), the CPU 201 determines in S508 whether or not the alarm function of the RTC 202 has operated and the interrupt signal 209 has been input. If the CPU 201 determines that the alarm function of the RTC 202 has not operated and the interrupt signal 209 has not been input (NO in S508), the CPU 201 causes the process to proceed to S501. On the other hand, if the CPU 201 determines that the alarm function of the RTC 202 has operated and the interrupt signal 209 has been input (YES in S508), the CPU 201 cancels the setting of the alarm function of the RTC 202 (S509) and executes the shutdown process (S510).

As descried above, according to the second embodiment, unnecessary reboot is not executed since the image forming apparatus 1 is immediately shut down if an abnormality that requires reboot occurs in a state (immediately before the automatic shutdown) in which the image forming apparatus 1 will soon be shut down by the automatic shutdown function. In doing so, time for which the image forming apparatus 1 remains (is left) in a state in which an operation for forming an image cannot be performed is minimized, thereby reducing unnecessary consumption of power as much as possible and realizing power saving.

Third Embodiment

Figure 7:
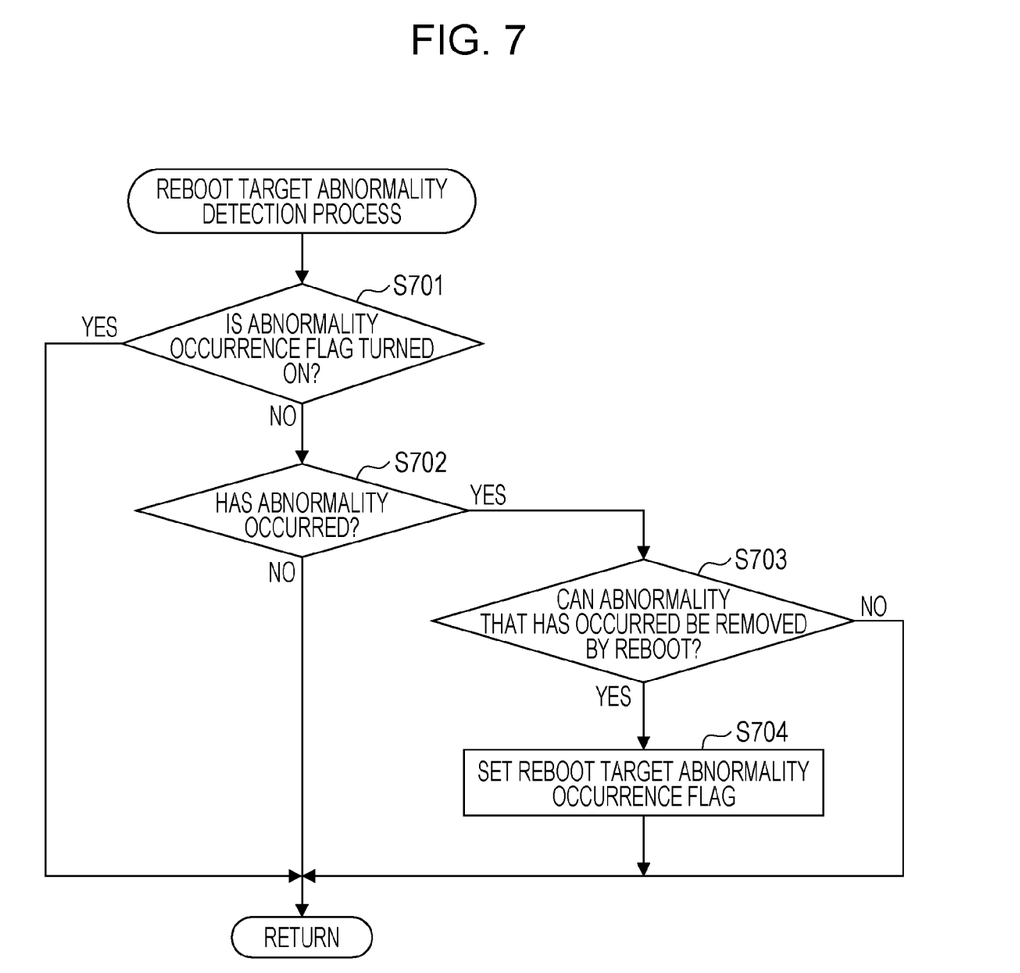
FIG. 7 is a flowchart illustrating an example of a process for detecting occurrence of an abnormality that requires reboot according to a third embodiment.

FIG. 7 is a flowchart illustrating an example of a process for detecting whether or not an abnormality that requires reboot has occurred according to a third embodiment. The process described in the flowchart is realized by the CPU 201 by executing a program loaded from the nonvolatile memory 205 into the memory 203.

In S701, the CPU 201 determines on the basis of the abnormality occurrence flag whether or not an abnormality that requires reboot has already been detected. If the CPU 201 determines that an abnormality that requires reboot has already been detected (the abnormality occurrence flag is ON) (YES in S701), the CPU 201 ends the process described in the flowchart.

On the other hand, if an abnormality that requires reboot has not been detected (the abnormality occurrence flag is off) (NO in S701), the CPU 201 causes the process to proceed to S702.

In S702, the CPU 201 determines whether or not an abnormality has occurred. Here, occurrence of not only a hang-up of the sub-CPU 221 described in the first embodiment with reference to S402 to S404 illustrated in FIG. 4 but also various abnormalities are determined. For example, S702 includes a determination of whether or not an abnormality has occurred in a module (for example, the hard disk device 6, the operation unit 5, or the like) other than the sub-CPU 221, the determination being made by the CPU 201 by communicating with the module. In addition, S702 also includes a determination of occurrence of an abnormality made by the CPU 201 by instructing the sub-CPU 221 to determine whether or not an abnormality has occurred in a device (the printer device 4, the scanner device 2, the facsimile device 7, or the like) connected to the sub-board 220 and using an error code returned from the sub-CPU 221. For example, the sub-CPU 221 determines whether or not abnormalities including a failure of the fixing unit of the printer device 4, a hang-up of a controller of the printer device 4, and a hang-up of a controller of the scanner device 2 have occurred.

If the CPU 201 determines in S702 that an abnormality has not occurred (NO in S702), the CPU 201 ends the process described in the flowchart. On the other hand, if the CPU 201 determines that an abnormality has occurred (YES in S702), the CPU 201 causes the process to proceed to S703.

In S703, the CPU 201 determines whether or not the abnormality that has occurred can be removed by reboot. For example, the CPU 201 determines on the basis of the list of information (stored in the nonvolatile memory 205) illustrated in FIG. 6 whether or not the abnormality that has occurred can be removed by reboot. For example, the CPU 201 determines that the abnormality cannot be removed by reboot if a hard disk failure (error code "E-002") or a fixing unit failure (error code "E-001") has occurred. On the other hand, the CPU 201 determines that the abnormality can be removed by reboot if a sub-CPU hang-up (error code "E-003") has occurred. Furthermore, for example, although not illustrated in FIG. 6, if a hang-up of the controller of the printer device 4, a hang-up of the controller of the scanner device 2, or the like has occurred, the CPU 201 determines that the abnormality can be removed by reboot.

If the CPU 201 determines in S703 that the abnormality that has occurred cannot be removed by reboot (NO in S703), the CPU 201 ends the process described in the flowchart.

On the other hand, if the CPU 201 determines in S703 that the abnormality that has occurred can be removed by reboot (YES in S703), the CPU 201 causes the process to proceed to S704. In S704, the CPU 201 turns on, in the memory 203, the flag indicating that an abnormality has been detected (turns on the abnormality occurrence flag) and ends the process described in the flowchart.

As described above, the present disclosure is not limited to a case in which the sub-CPU 221 has hung up. In another exemplary embodiment, for example in a case where an abnormality other than the sub-CPU hang-up has occurred, the occurrence of the abnormality is detected based on a method according to the abnormality instead of on whether there has been a response to transmission of a message to the sub-CPU 221.

According to the third embodiment, execution of unnecessary reboot can be suppressed even if an abnormality that automatically triggers reboot has occurred immediately before the operation of the automatic shutdown function. In addition, since unnecessary reboot is not executed, wasteful consumption of power and generation of unnecessary noise can be suppressed.

In addition, in the above exemplary embodiments, a configuration has been described in which, if an abnormality that requires reboot has occurred, whether to execute reboot is controlled by comparing the time remaining until the shutdown time set for the automatic shutdown function with the threshold. However, this configuration is not seen to be limiting. For example, in another exemplary embodiment, various types of shutdown including one realized by a time specification shutdown function, by which shutdown is executed at a shutdown time specified in advance can be implemented. That is, if an abnormality that requires reboot has occurred, the CPU 201 compares time remaining until one of various shutdown times set for the automatic shutdown function, the time specification shutdown function, and the like with a threshold. If the time remaining until the shutdown time is longer than the threshold, the CPU 201 performs control in such a way as to execute reboot, and if the time remaining until the shutdown time is shorter than the threshold, the CPU 201 performs control in such a way as not to execute reboot.

Furthermore, in still yet another exemplary embodiment, the image forming apparatus 1 may need to be restarted due to another factor. For example, when software has been updated (for example, automatically updated) in the image forming apparatus 1 and the image forming apparatus 1 needs to be rebooted in order to apply new software. In still yet another exemplary embodiment, the image forming apparatus 1 may need to be rebooted in order to apply a new setting when a particular setting (for example, the setting of an IP address) has been changed in the image forming apparatus 1 (for example, update of a program that requires reboot for application) has occurred, the CPU 201 compares the time remaining until one of various shutdown times with the threshold. If the time remaining until the shutdown time is longer than the threshold, the CPU 201 performs control in such a way as to execute reboot, and if the time remaining until the shutdown time is shorter than the threshold, the CPU 201 performs control in such a way as not to execute reboot.

The above-described exemplary embodiments are not limited to being applied to an image forming apparatus. Additional exemplary embodiments may be applied to any information processing apparatus that has a function of automatically shutting down if a certain condition of the automatic shutdown function, the time specification shutdown function, or the like is satisfied and that is capable of detecting an event that requires reboot, such as occurrence of an error that requires reboot.

As described above, when an event that requires restart of an information processing apparatus such as an image forming apparatus has occurred in the information processing apparatus, restart is executed if the time remaining until the shutdown time is longer than the threshold. On the other hand, if the time remaining until the shutdown time is shorter than the threshold, control is performed in such a way as not to execute restart. Therefore, even if an event that requires reboot has occurred in a state in which shutdown will soon be executed by one of various functions such as the automatic shutdown function and the time specification shutdown function, unnecessary reboot is not executed. Therefore, since unnecessary reboot is not executed, wasteful consumption of power and generation of noise can be suppressed.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-155310, filed Jul. 26, 2013, which is hereby incorporated by reference herein in its entirety.

What is claimed is:

1. An information processing apparatus comprising:
a memory; and
at least one processor in communication with the memory, the processor configured to control:
a first execution unit configured to execute shutdown processing for turning off the information processing apparatus at a predetermined time;
a second execution unit configured to execute restart processing for turning off and restarting the information processing apparatus when an event requiring restart of the information processing apparatus has occurred; and
a control unit configured to, even if the event requiring restart of the information processing apparatus has occurred and if a remaining time before the first execution unit executes the shutdown processing at the predetermined time is shorter than a threshold, control the second execution unit not to execute the restart processing and control the first execution unit to execute the shutdown processing at the predetermined time.

2. The information processing apparatus according to claim 1, wherein, if the remaining time is longer than the threshold, the second execution unit executes the restart processing when the event requiring restart of the information processing apparatus has occurred.

3. The information processing apparatus according to claim 1,
wherein the event requiring restart of the information processing apparatus includes a case in which an abnormality that is removed by restarting the information processing apparatus has occurred in the information processing apparatus, a case in which the information processing apparatus needs to be restarted in order to apply software update in the information processing apparatus, or a case in which the information processing apparatus needs to be restarted in order to apply a new setting in the information processing apparatus.

4. The information processing apparatus according to claim 3,
wherein the abnormality that is removed by restarting the information processing apparatus includes a state in which a processor that controls the information processing apparatus is not-functional.

5. The information processing apparatus according to claim 1, wherein the information processing apparatus is an image forming apparatus.

6. A method for controlling an information processing apparatus, the method comprising the steps of:
comparing, if an event requiring restart of the information processing apparatus has occurred, a remaining time before a shutdown time with a threshold, wherein the shutdown time is at which a first execution unit executes shutdown of the information processing apparatus by turning off the information processing apparatus; and
shutting down, if the remaining time is shorter than the threshold, the information processing apparatus without restarting the information processing apparatus, wherein restarting the information processing apparatus is executed by a second execution unit and includes turning off and restarting the information processing apparatus.

7. The method according to claim 6, further comprising restarting, if the remaining time is longer than the threshold, the information processing apparatus.

8. A non-transitory computer readable storage medium storing computer executable instructions for causing a computer to implement a method, the method comprising:
comparing, if an event requiring restart of the information processing apparatus has occurred, a remaining time before a shutdown time with a threshold, wherein the shutdown time is at which a first execution unit executes shutdown of the information processing apparatus by turning off the information processing apparatus; and
shutting down, if the remaining time is shorter than the threshold, the information processing apparatus without restarting the information processing apparatus, wherein restarting the information processing apparatus is executed by a second execution unit and includes turning off and restarting the information processing apparatus.

* * * * *